F. J. WOOD.
PROCESS OF PURIFYING SALT.
APPLICATION FILED DEC. 30, 1916.
1,346,624. Patented July 13, 1920.
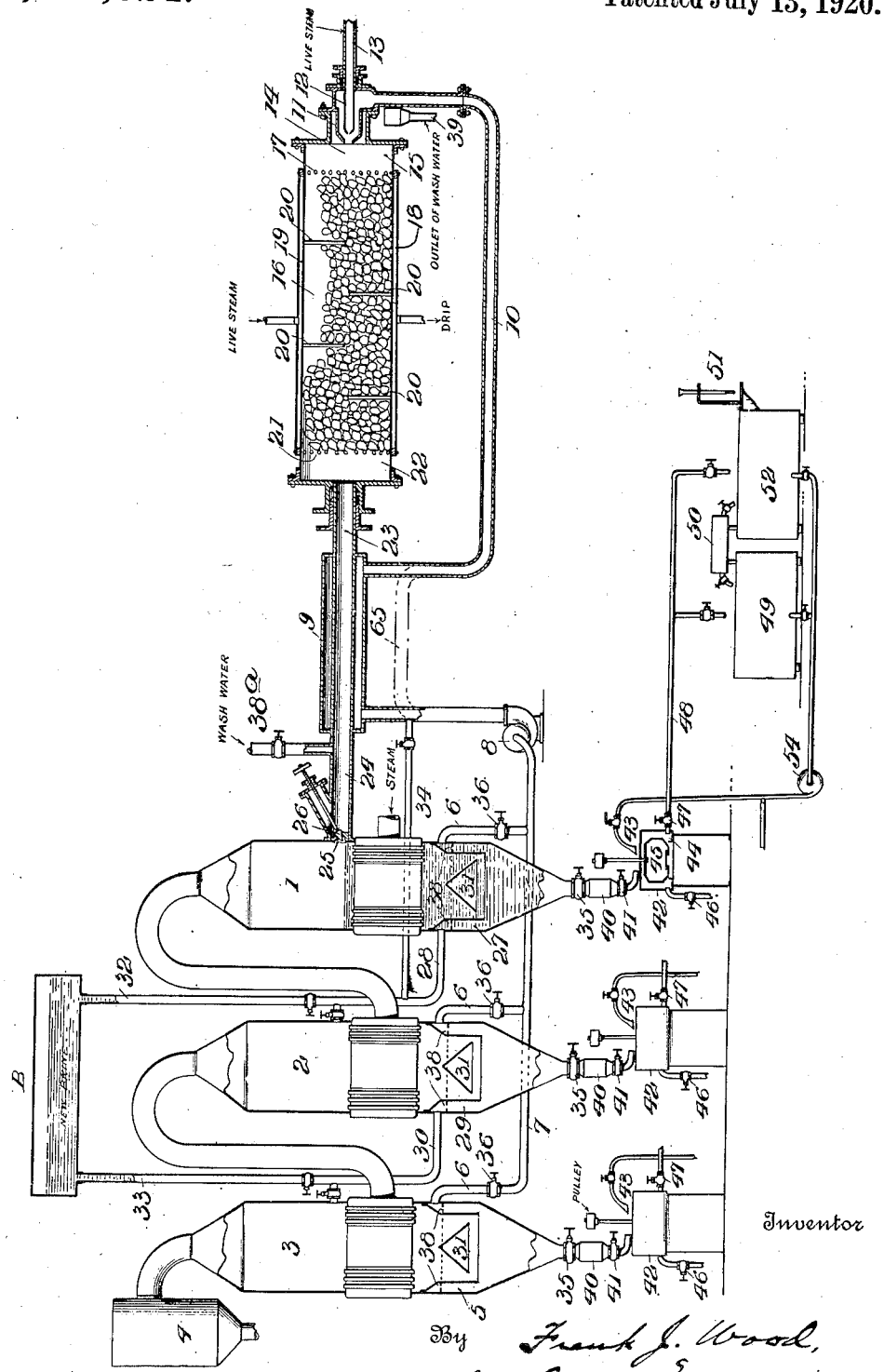
Inventor
Frank J. Wood,
By McGill & Maguire, Attorneys

UNITED STATES PATENT OFFICE.

FRANK J. WOOD, OF BROOKLYN, NEW YORK, ASSIGNOR TO WORCESTER SALT COMPANY, OF NEW YORK, N. Y., A CORPORATION OF NEW YORK.

PROCESS OF PURIFYING SALT.

1,346,624.   Specification of Letters Patent.   Patented July 13, 1920.

Application filed December 30, 1916. Serial No. 139,761.

*To all whom it may concern:*

Be it known that I, FRANK J. WOOD, of Brooklyn, in the county of Kings and State of New York, have invented certain new and useful Improvements in Processes of Purifying Salt; and I do hereby declare the following to be a full, clear, and exact description of the invention, such as will enable others skilled in the art to which it appertains to make and use the same.

My object is to provide a novel process for crystallizing salt in cubical grains.

I boil brine under a vacuum and maintain it below the concentration at which the impurities will precipitate with the salt. The brine flow is drawn from a body of boiling brine and placed under pressure. It is then combined with a column of steam and conducted to a filter where the calcium sulfate or gypsum is precipitated, after which the brine flow is returned to the boiling body of brine under reduced pressure. Salt crystals are here precipitated and the flow is again heated, filtered and returned and the repetition of the cycle continued.

I also provide for introducing new brine into the brine flow either in the one body of boiling brine or in the travel from one vacuum pan to another when a plurality of pans are used, the rate of the brine flow being greater than that of the new brine supply, and the new brine being at a temperature below the boiling point of the vacuum pan.

When a plurality of vacuum pans is employed the brine flow is successively conducted to the pans and the succeeding pans have higher degrees of vacuum and consequently lower boiling points.

I also make provision for washing the salt recovered after the brine flow has been filtered and sufficiently evaporated, this washing being accomplished by a solution of pure brine. The filtering step so effectively removes the calcium sulfate that only calcium chlorid remains in the flow and therefore I am enabled to employ only a relatively small portion of carbonate of soda, the carbonate radical combining with the calcium to form an insoluble precipitate in the nature of chalk while the sodium and chlorin combine to form the pure brine which is used for the washing of the brine flow.

In the accompanying drawing I have shown apparatus appropriate for carrying out my invention, the view being a vertical longitudinal sectional view in conventional arrangement.

As illustrated there are three vacuum pans in triple effect arrangement. These vacuum pans, except for the purifying connections, dust separators and receivers, are of the ordinary type that is used in making salt. The steam and vapor connections and condenser are of the usual type. 1 is the first effect of the three pans. 2 is the second effect pan and 3 is the third effect. 4 is a condenser. B is a brine supply which may feed to any one or more of the pans.

The general idea of the invention will be comprehended from the following course of steps.

Commencing at the brine receiver 5 and following along with the flow of brine as it passes from the pan 3 to and through the purifying system, the brine is drawn from this pan 3 into the brine receiver 5 which has such a large volume that the flow of brine upwardly through it has but a very slow current; consequently the salt grains will settle and but very little salt will be drawn along with the brine flow to the pipe 6. This pipe is connected to the main 7 through which the brine flows to the pump 8 where the pressure is raised from that of a partial vacuum to 80 pounds and then flows to the heat exchanger 9. Here the brine flow is heated by flowing through surfaces that are heated by the vapors of a previous step.

From the heat exchanger 9 the brine passes on through the pipe 10 to the injector heater 11. Here the brine flow is heated and the solid particles of salt dissolved by the condensation of a jet of steam projected into the brine flow from the nozzle 12 which receives its steam supply from high pressure boilers through the pipe 13. The nozzle 12 may be adjusted to bring it nearer or farther away from the combining orifice 14. By this adjustment an impetus can be given to the brine flow and also disagreeable noises can be prevented by combining the condensing steam with brine as it flows with considerable velocity through this combining orifice 14. The brine flow now enters the end chamber 15 of the filter 16. Not far inside is the grating 17 which prevents the cobble stones 18 from falling into the end chamber 15. The heated brine flows through the interstices between the cobble stones 18 and as the calcium sulfate is less soluble in brine heated to 250 or near 300 degrees considerable of it deposits on and adheres to the stones 18. Farther along heating of the brine is obtained by the steam jacket 19 that surrounds the filter 16. The temperature of the steam in this steam jacket is considerably higher than that of the brine inside the filter so that the brine becomes more and more heated as it flows through the filter. Baffle plates 20 deflect the brine flow so that the heated layers next to the steam jacket deflect toward the center of the filter. The brine now flows through the grating 21 into the end chamber 22 and then into the pipe 23 and then to the heat exchanger 9 where this heated brine flow gives up much of its heat as it flows along the outside of one or more tubes in the opposite direction to that of the flow that is coming from the pump 8. Here considerable of the heat that is in the heated brine passes to lesser heated brine coming from the pan 3.

From the heat exchanger 9 the flow passes through the pipe 24 to the flash nozzle 25 the size of the orifice in this flash nozzle being adjustable by the conical valve 26 which makes it possible to change the volume of the flow through the filter and also the pressure. From the flash nozzle the brine flows into pan 1. Steam of considerable volume is released from the hot brine issuing from the flash nozzle and passes out of pan 1 through the vapor pipe along with the vapor into the steam belt of pan 2. Obviously this steam aids in doing evaporating in pan 2. After the brine flow has circulated around during ebullition in pan 1, it is drawn into the receiver 27 of pan 1 and passes through the pipe 28 into the pan 2 and after circulating around in this pan while evaporation is in progress it is drawn into the receiver 29 and passes through the pipe 30 into pan 3. Salt is precipitated in each of the pans. New brine from B may be fed into the brine flow at any point, as through the pipes 32 and 33. The brine flow first cycle is now complete.

In operation the pans are boiling at the proper temperatures and vacuums. New brine is being fed into the system through the pipes 32 and 33. I will assume that 3 per cent. of the solid constituents of this new brine is calcium sulfate or gypsum. Now this calcium sulfate is reduced in concentration and prevented from precipitating along with the salt by drawing continuously from the pans a flow of brine that is in quantity considerably in excess of the feed that enters the system through the pipes 32 and 33. This brine flow in making the cycle deposits a large part of the calcium sulfate in the filter and is returned to the first effect pan with a much smaller percentage of calcium sulfate than at the commencement of the brine flow cycle. The evaporation is carried on for some period of time before the calcium sulfate in brine in the pans will become sufficiently concentrated for its precipitation to take place, but before that degree of concentration can come about the brine is passed around through another cycle. Meanwhile the concentration and precipitation of the salt continue. The salt precipitates by evaporation and not by heat. The calcium sulfate will partially precipitate under a high heat and will fully precipitate if evaporation is carried on. But if one-half of it, for instance, is precipitated by heat and the heat is lessened boiling will not at once commence precipitation because at the lower temperature about half the water will have to be boiled out before a concentration will be reached sufficient to cause precipitation. It is not possible and it is not necessary to precipitate all of the calcium sulfate out of the brine that constitutes the brine flow, for with the assumption that the calcium sulfate is 3 per cent. of the brine that is fed into the system while the brine flow is in volume double the quantity of that of the feed, then if half of the calcium sulfate that is in the brine flow at the beginning of the cycle is being continuously deposited on the filtering stones it is obvious that none can be discharged with the salt leaving the pans through the valves 35. In other words the whole of the calcium sulfate that is going into the system with the feed is only equal to one-half of that which is passing around the cycle in the brine flow the latter being double the quantity of the feed flow. Then if half of the impurity in the brine flow is taken out all of the impurity that goes in with the feed must necessarily be deposited in the filter, consequently none of the calcium sulfate can come out through the valves 35 with the salt.

The deflecting cones 31 in the pans are for the purpose of deflecting the salt to near the lower edges of the brine flow receivers. The slight current entering the receivers will tend to take along with it any dust particles of impurities.

It is possible that some fraction of the body of brine in each vacuum pan will not thoroughly mix with the main body but will circulate around in one portion of the pan until a concentration of the impurities in the fraction will occur. This concentration may bring about a slight precipitation so that small particles of flaky dust of calcium sulfate will slowly settle toward the bottom of the pan. The salt grains mostly being larger and heavier than these dust particles will fall through to the bottom of the pan while the current into the receivers will divert the dust particles and cause them to follow along with the brine flow and eventually these particles will be caught in the filter 16 by becoming coated with the sticky calcium sulfate and adhering to the cobble stones.

As minute particles of salt are to some extent carried along with the brine flow from the pans these are dissolved by the dilution effected by the condensing of the steam that combines with the brine at the injector heater. If these particles of salt were not dissolved they would furnish surfaces to which the gypsum would adhere and they would carry the gypsum back into the pans. Also they would tend to accumulate in the filter and retard its efficiency.

As is necessary with triple effects the temperature of the first effect is higher than that of the second as is also the case with the second as compared with the third. Also it is necessary that the vacuum is lower on the first effect than the second and highest in the third effect. It is obvious that the brine flowing from the first effect into the second and from the second to the third would flash as the flow passed from the higher temperature and lower vacuum to the lower temperature and higher vacuum. These flashings may be permitted if desired. They may not be desirable, however, for various reasons, one of which is that their tendency is to diminish the size of the salt grains. When it is deemed desirable to use only the one flashing my process makes full provision for attaining all the advantages attending a plurality of flashings while avoiding their use and their undesirable characteristics. For this purpose I may feed the new brine into the brine flow 28 and 30 through the pipes 32 and 33. This new brine, being the brine supply from which the salt is produced, is cold, and has the effect of cooling the brine flow between the pans to a temperature that is below that at which any steam flashes out. If this cold brine supply is not sufficient in quantity to prevent this flashing in both pans, I can feed the larger proportion into pipe 30 and cool the flow in the pipe 28 by using some of the brine flow coming from the pump 8 before it enters the heat exchanger and lead it through the pipe 34 to the pipe 28. The brine coming from the pan 3 is so much lower in temperature than that in the pipe 28 that this will effectually prevent flashing into the pan 2 if a sufficient quantity is used.

The heat exchanger 9 cools off the brine flow to some extent before it enters pan 1 and as the water that is condensed from the jet of the injector heater dilutes the brine these two features tend to do the crystallizing of salt in the flashing brine jet as it enters pan 1 from the flash nozzle 25 but even with the finer grain salt I prefer to allow this flashing in pan 1 rather than go to the expense of much cooling before discharging the brine flow into this pan 1.

When the cobble stones in the filter 16 are coated thickly with calcium sulfate the whole filter cylinder is rotated and water is supplied through the pipe 38ª into the filter and out through the pipe 39. The tumbling of these stones over one another grinds the calcium sulfate into a powder which is easily carried away with the water that flows through. Suitable valves and means of disconnecting may be placed on the pipes and connections so that washing out may be accomplished.

It may be desired at times not to use the heat exchanger 9 in which event the brine flow may be passed through the pipe indicated by the dotted line 65 and returned through the center pipe of the heat exchanger.

In the second stage of the purifying system the salt is collected in the chambers 40 and when full is dropped along with considerable brine through the valve 41 into the centrifugals 42. The centrifugal 42 of the pan 1 is shown in section. The other two are of corresponding construction. It is provided with a washing spray 43 and two outlet valves 46, 47 and a trough 44 that catches the liquid thrown out of the basket 45. One of the outlet valves, 46, when opened permits the liquid that flows through it to run to a sewer and away. The other valve, 47, turns the liquid to the conduit 48 that leads to the tanks 49 and 52. A small tank 50 is arranged so that its contents may be emptied into the tank 49 or 52. An impurity analyzing apparatus 51 is placed conveniently near the tanks 49 and 52 so that samples can be dipped from these tanks and analyzed. The tank 52 is similar to tank 49 and is related to the tank 50 and apparatus 51 identically the same as is tank 49.

The operation of this washing step is as follows: Salt accumulates in the chamber 40 of pan 1 until full; the valve 35 is closed and the valve 41 is opened and the salt that has accumulated along with brine in the interstices, drops down into the centrifugal extractor 42. A rapid rotation of the basket 45 drives the brine through the perforations around the walls of the basket and the brine flows out through the valve 46 to the sewer. When this brine practically ceases to be discharged from the basket the valve 46 is closed and the valve 47 is opened. A spray of pure brine is now turned into the basket from the washing spray nozzle 43. This pure brine dilutes or diminishes the mother liquor of the pans or calcium chlorid solution that still adheres to some extent to the salt crystals in the basket 45. This pure brine, now impregnated with a small quantity of calcium chlorid, flows through the pipe 48 to the tank 49. The pure brine is forced to the spray nozzle 43 from the tank 52 by the pump 54. After the tank 49 becomes full a sample of the contents is taken into the chemical apparatus and the quantity of carbonate of soda solution, necessary to change the calcium chlorid that is in solution in tank 49 into calcium carbonate and sodium chlorid, is put into tank 50. This solution is then run into and mixed with the contents of tank 49. The carbonate of calcium then settles to the bottom and the pure brine now in tank 49 is used to spray the salt in the basket of the centrifugal extractor. Manifestly this step requires very little carbonate of soda owing to the only calcium sulfate being that which is in the thin coating of mother liquor that persists in clinging to the crystals of salt after centrifuging in the centrifugal. The crystals of salt are pure of themselves and the only impurities left are in solution in the thin coating of mother liquor surrounding each crystal of salt. The washing with pure brine eliminates this impure coating and in this way the pure wash brine becomes contaminated with this small amount of mother liquor so all that is necessary is to chemically treat this wash brine to make it pure brine again. The very small amount of soda required to do this is a much cheaper way of obtaining pure brine than to dissolve a batch of pure salt to make brine.

It is obvious that the valves 36 on the pipes that lead down to the suction pipe 7 could be so adjusted by shutting off those of pans 2 and 3 that pan 1 could be used alone on the purifying system. Or the pans 1 and 2 could be on the purifying system by shutting valve 36 of pans 1 and 3 and be operated together and pan 3 be not working. When all three pans are working valves 36 on pans 1 and 2 are shut off and the cycle is complete through pipes 28 and 30.

At the upper part of each of the chambers 5, 27 and 29, there is shown an annular contraction 38 which distributes the flow practically even all around the chamber from the bottom up to the contraction, but above the contraction the flow takes a course from all around the space to the pipes 6, 28 and 30. If it were not for these annular contractions 38 the flow would tend to take the nearest course to the pipes 6, 28 and 30, which would tend to carry too much salt, due to the swiftness of the current directly under and near these pipes. Obviously perforations could be distributed around the top of the chamber instead of the annular contractions.

A series of vacuum pans could be connected together in a series on a brine flow system for purifying while not being arranged as a multiple effect system of evaporation.

It is known in this art that where the salt is precipitated in grainers the crystals are of irregular formation and that truly cubical crystals can be obtained by precipitation from a boiling body of brine in a vacuum pan. My invention, among other features, contributes to the art of producing cubical grains the step of thoroughly dissolving the salt particles that may have failed to precipitate in the pan and be carried along with the brine flow toward the filter. Before entering the filter the flow encounters the steam jet. This heats the flow and in doing so the steam is condensed and the water thoroughly dissolves the salt particles. Thus there are no solid particles of salt to which the calcium sulfate may attach and on which it might be carried back to the pan and there settle and contaminate the salt. In consequence the cubical crystals which I obtain are relatively pure.

I claim as my invention:

1. Crystallizing salt in cubical grains consisting of continuously drawing a flow of brine from a body of boiling brine, raising the pressure, treating with heat by injecting steam into the flow, precipitating and filtering off impurities, and returning the flow to the body of boiling brine.

2. The process of making purified salt consisting of preventing the precipitation of the dissolved impurities in a body of boiling brine by drawing continuously a flow of brine therefrom, increasing the pressure of the flow, heating and diluting by injecting steam into the flow, precipitating and filtering a portion of the impurities, then reducing the pressure of the flow and returning it to the body of boiling brine.

3. The process of purifying salt consisting of crystallizing cubical grains from a body of brine that is boiling under a vacuum, the body of brine being kept below the concentration at which impurities will precipitate by maintaining a flow of brine drawn from the boiling body, settling the greater part of the small crystals of salt from the flow, raising the pressure of the flow, passing the flow in one direction adjacent to a more highly heated flow that is flowing in an opposite direction to extract heat, further heating the flow and dissolving salt grains by the direct contact and condensation of a jet of steam, passing the flow through filtering material, further heating the flow during filtration, passing the flow through a pressure reducing orifice, and flashing into an evaporating body of brine in a vacuum.

4. In a salt purifying process, initially heating the brine, filtering the brine to remove the calcium sulfate, conducting the brine flow to a plurality of vacuum pans in multiple effect, and adding new brine to the brine flow from one pan to another to lower the temperature of the flow below the boiling point in the latter vacuum pan.

5. In a salt purifying process, initially heating the brine, adding steam to the brine flow, filtering the brine under pressure, and conducting the brine flow to a plurality of vacuum pans in multiple effect, and introducing new brine into the brine flow from one pan to another to lower the temperature of the flow below the boiling point of the latter vacuum pan.

6. In a salt purifying process, boiling the brine in a vacuum pan, drawing a flow from the pan, dissolving the solid particles of salt in the flow by injecting a steam jet, precipitating the calcium sulfate from the brine flow, returning the flow to the boiling body of brine in the pan, and precipitating salt from the brine in cubical grains.

7. In a salt purifying process, withdrawing a flow of brine from the last vacuum pan in a series thereof in multiple effect, heating the flow and precipitating impurities therefrom by the injection of a steam jet, filtering the flow, and returning the flow to the first vacuum pan of the series and then to the succeeding pans, and precipitating salt in each of the pans.

8. In a salt purifying process, boiling brine in a plurality of vacuum pans in multiple effect, supplying new brine to the pans, drawing a flow of brine from the pans in excess of that of the new brine, combining a steam jet with the brine flow, precipitating and filtering off the calcium sulfate from the brine flow, returning the flow to the pans, precipitating salt in each of said pans, and repeating the cycle set forth.

9. In a salt purifying process, initially heating the brine, filtering the brine, conducting the brine to a plurality of vacuum pans in multiple effect, and introducing into one of the pans part of the flow from a pan of lower temperature to prevent flashing.

In testimony whereof I have signed this specification.

FRANK J. WOOD.